(12) United States Patent
Rea et al.

(10) Patent No.: US 11,411,418 B2
(45) Date of Patent: Aug. 9, 2022

(54) BATTERY MANAGEMENT SYSTEMS AND METHODS

(71) Applicant: The Raymond Corporation, Greene, NY (US)

(72) Inventors: David Rea, Pittsford, NY (US); Kenneth L. Kaye, Fairport, NY (US); David James Reed, Fairport, NY (US); Matthew Fronk, Honeoye Falls, NY (US); Thaddeus Grey, Canandaigua, NY (US)

(73) Assignee: The Raymond Corporation, Greene, NY (US)

(*) Notice: Subject to any disclaimer, the term of this patent is extended or adjusted under 35 U.S.C. 154(b) by 59 days.

(21) Appl. No.: 17/112,301

(22) Filed: Dec. 4, 2020

(65) Prior Publication Data

US 2021/0175729 A1 Jun. 10, 2021

Related U.S. Application Data

(60) Provisional application No. 62/944,825, filed on Dec. 6, 2019.

(51) Int. Cl.
*H02J 7/00* (2006.01)

(52) U.S. Cl.
CPC .......... *H02J 7/0063* (2013.01); *H02J 7/0013* (2013.01); *H02J 7/00032* (2020.01); *H02J 7/0047* (2013.01); *H02J 7/007194* (2020.01)

(58) Field of Classification Search
CPC ....................................................... H02J 7/00
See application file for complete search history.

(56) References Cited

U.S. PATENT DOCUMENTS

| | | |
|---|---|---|
| 5,931,245 A | 8/1999 | Uetake |
| 8,207,704 B2 | 6/2012 | Kai |
| 9,425,492 B2 | 8/2016 | Mao |
| 9,430,021 B2 | 8/2016 | Lu |
| 10,059,217 B2 | 8/2018 | Min |
| 10,429,831 B2 | 10/2019 | Thomson |
| 10,549,650 B2 | 2/2020 | Aronov |

(Continued)

FOREIGN PATENT DOCUMENTS

| | | |
|---|---|---|
| EP | 2837944 A1 | 2/2015 |
| WO | 2020077126 A1 | 10/2019 |

*Primary Examiner* — Robert Grant
(74) *Attorney, Agent, or Firm* — Quarles & Brady LLP

(57) ABSTRACT

A battery management system is provided. The battery management system includes a controller comprising at least one processor and at least one memory. The at least one memory comprising instructions executed by the at least one processor to receive load information about a load from a load sensor, receive battery operating information from a battery sensor, determine a number of battery modules needed to supply the load and operate each battery module at or below a preferred discharge rate based on the load information and the battery operating information, select a group of battery modules included in the battery based on the number of battery modules and the battery operating information, each battery module included in the group of batteries having a current depth of discharge within the preferred depth of discharge range, and instruct the battery to supply the load using the group of battery modules.

20 Claims, 5 Drawing Sheets

(56) References Cited

U.S. PATENT DOCUMENTS

| | | |
|---|---|---|
| 10,556,514 B2 | 2/2020 | Harman |
| 10,608,445 B2 | 3/2020 | Kaneko |
| 2013/0141047 A1 | 6/2013 | Huang |
| 2013/0141048 A1 | 6/2013 | Huang |
| 2014/0266061 A1 | 9/2014 | Wachal |
| 2019/0217739 A1 | 7/2019 | Sinha |
| 2019/0280520 A1* | 9/2019 | Zhang .................. H02J 9/062 |
| 2019/0359071 A1* | 11/2019 | Lin .................. H01M 10/425 |
| 2020/0016989 A1 | 1/2020 | Aronov |
| 2020/0026271 A1 | 1/2020 | Thomson |

* cited by examiner

BATTERY MANAGEMENT SYSTEMS AND METHODS

CROSS-REFERENCES TO RELATED APPLICATIONS

The present application is based on and claims priority to U.S. Provisional Patent Application No. 62/944,825, filed on Dec. 6, 2019.

STATEMENT REGARDING FEDERALLY SPONSORED RESEARCH

Not Applicable.

BACKGROUND

Material handling vehicles commonly use rechargeable batteries (also known as secondary batteries) as a power source. Rechargeable batteries have a finite number of charge and discharge cycles before the useful life of the battery is over. In order to operate the batteries efficiently, battery management systems are implemented to monitor battery operation.

Battery management systems can include sensors used to derive a state-of-charge parameter. The sensors can also be used to derive a state-of-health parameter. Battery management systems can also include circuitry to prevent overcharging of the battery and operate the battery within predefined limits.

BRIEF SUMMARY

The present disclosure relates generally to battery management systems for vehicles. Specifically, the present disclosure relates to a battery management system optimized to extend the useful life of the battery using battery-specific parameters such as cell chemistry, empirical data from state-of-charge swings, and/or cell construction.

In one aspect, the present disclosure provides a battery management system. The battery management system includes a battery sensor coupled to a battery comprising at least one battery module, a load sensor coupled to a load, an actuator coupled to the at least one battery module and the load, and a controller coupled to the battery sensor, the load sensor, and the actuator. The at least one battery module being associated with a preferred depth of discharge range and a preferred discharge rate. The controller comprising at least one processor and at least one memory. The at least one memory comprising instructions executed by the at least one processor to receive load information about the load from the load sensor, receive battery operating information from the battery sensor, determine a number of battery modules needed to supply the load and operate each battery module at or below the preferred discharge rate based on the load information and the battery operating information, select a group of battery modules included in the battery based on the number of battery modules and the battery operating information, each battery module included in the group of batteries having a current depth of discharge within the preferred depth of discharge range, and instruct the battery to supply the load using the group of battery modules.

In one aspect, the present disclosure provides a battery management system that includes a battery sensor coupled to a battery comprising at least two battery modules, a load sensor coupled to a load, an actuator coupled to the at least two battery modules and the load, and a controller coupled to the battery sensor, the load sensor, and the actuator. The controller comprising at least one processor and at least one memory. The at least one memory comprising instructions executed by the at least one processor to receive a battery profile comprising a plurality of operating parameter sets, each operating parameter set comprising a preferred discharge rate, a preferred depth of discharge range, and at least one environmental factor, receive load information about the load from the load sensor, receive battery operating information from the battery sensor, select a target operating parameter set included in the plurality of operating parameter sets based on the battery operating information, determine a number of battery modules needed to supply the load based on the load information, the battery operating information, and target operating parameter set, select a group of battery modules included in the battery based on the number of battery modules and the battery operating information, and instruct the battery to supply the load using the group of battery modules.

In one aspect, the present disclosure provides a battery management method that includes receiving load information about a load from a load sensor coupled to the load, receiving battery operating information from a battery sensor coupled to a battery comprising a plurality of battery modules, determining a number of battery modules needed to supply the load and operate each battery module included in the battery at or below the preferred discharge rate based on the load information and the battery operating information, selecting a group of battery modules included in the battery based on the number of battery modules and the battery operating information, each battery module included in the group of batteries having a current depth of discharge within the preferred depth of discharge range, and instructing the battery to supply the load using the group of battery modules.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
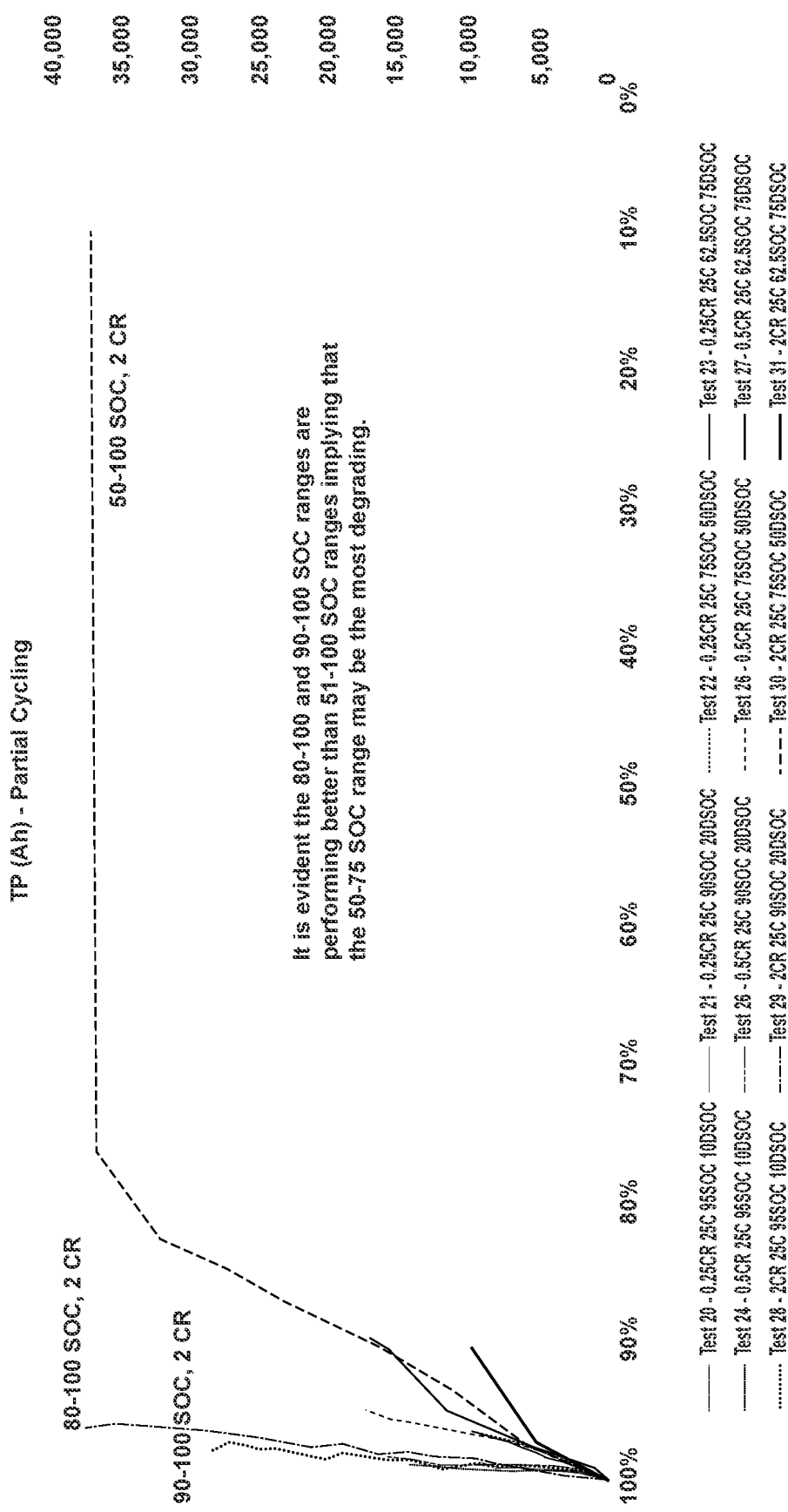
FIG. 1 is an exemplary graph of various state-of-charge (SOC) curves.

Corresponding reference characters indicate corresponding parts throughout several views. Although the drawings represent embodiments of the present disclosure, the drawings are not necessarily to scale and certain features may be exaggerated in order to better illustrate and explain the embodiments of the present disclosure.

DETAILED DESCRIPTION

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Generally, the present disclosure provides systems and methods for managing battery health in material handling vehicles.

FIG. 1 shows an exemplary graph of various state-of-charge (SOC) curves. Each curve represents a SOC curve for a battery to determine life-extending and/or charge-extending operating parameters for the battery. Life-extending parameters may be parameters that the battery may operate at in order to extend the useful life of the battery. The useful life of the battery can be related to how many charge/discharge cycles the battery can go through before the battery might be considered End Of Life for a specific application, for example 80% of initial capacity. Operating the battery in a manner that minimizes degrading of the battery can allow the battery to better maintain a capacity and thus operate longer between charge cycles, which can improve the efficiency of a warehouse. Thus, operating the battery with life-extending parameters can also extend the charge life between charge cycles. In general, batteries on a material handling vehicle may vary in cell chemistry, state-of-charge swings, and/or cell construction. The battery cell chemistry can include lithium-ion, lithium-ion polymer, nickel-metal hydride, nickel-cadmium, lead-acid, or any other type of cell chemistry suitable for powering a material handling vehicle. Depending on the chemistry, the cell construction of the battery can include cylindrical cells, pouch cells, or a custom shape, such as cells with lithium-ion polymer chemistry. The battery can include any number of cells configured to produce a nominal voltage. All of these varying composition and design factors may alter the performance characteristics of a battery within a material handling vehicle.

To determine a desired range of operating parameters and/or conditions for a battery within an material handling vehicle that provide charge-extending and performance benefits (i.e., operating parameters/conditions that are the least depleting to the lifespan and/or the battery's charge), a group of batteries with the same cell chemistry and construction may be subjected to individualized testing. Each battery can be subjected to a predetermined number of charge/discharge cycles with predetermined operational parameters for each battery. The parameters can include a charge rate, also referred to as C-rate (e.g., 2C), a discharge rate (e.g., 1C), a depth-of-discharge (DoD) operating window (e.g., 90-5%), environmental or cell temperature, or other parameters that may affect the operation and/or state-of-health (SOH) of the battery. Some batteries in the test may have duplicate sets of operational parameters for accuracy purposes, i.e. ten sets of operational parameters may be repeated for three different batteries for a total of thirty batteries.

The useful life of the battery, which can be related to SOH, can be monitored by measuring how well the battery maintains capacity in response to the charge/discharge cycles. More specifically, the amount of charge flowing in or out of the battery can be compared to the SOC. The SOH can be determined after each charging cycle and/or discharging cycle. Analysis can then be performed to determine the battery with the best SOH or average SOH after each cycle in order to determine a combination of operational parameters for the battery that promote extending the charge of the battery. For example, a battery may be determined to have a longer lifespan (i.e., a number of charging cycles while still having the ability to hold a useful charge) when used with a charge rate of 1C, a peak discharge rate of 2.5C, a usable capacity window of 80%-5% and at a cell temperature of 25° C. than at other values for the operational parameters. Some batteries may have different desired parameters in different environments, such as with different environmental temperatures. Multiple batteries with the battery construction (e.g. cell construction, cell chemistry, number of cells, etc.) used in the test may be configured to be used as modules of a larger battery. In other words, the larger battery has multiple modules with shared construction characteristics, which can be used to operate the battery in a battery life-extending manner as will be explained below.

Figure 2:
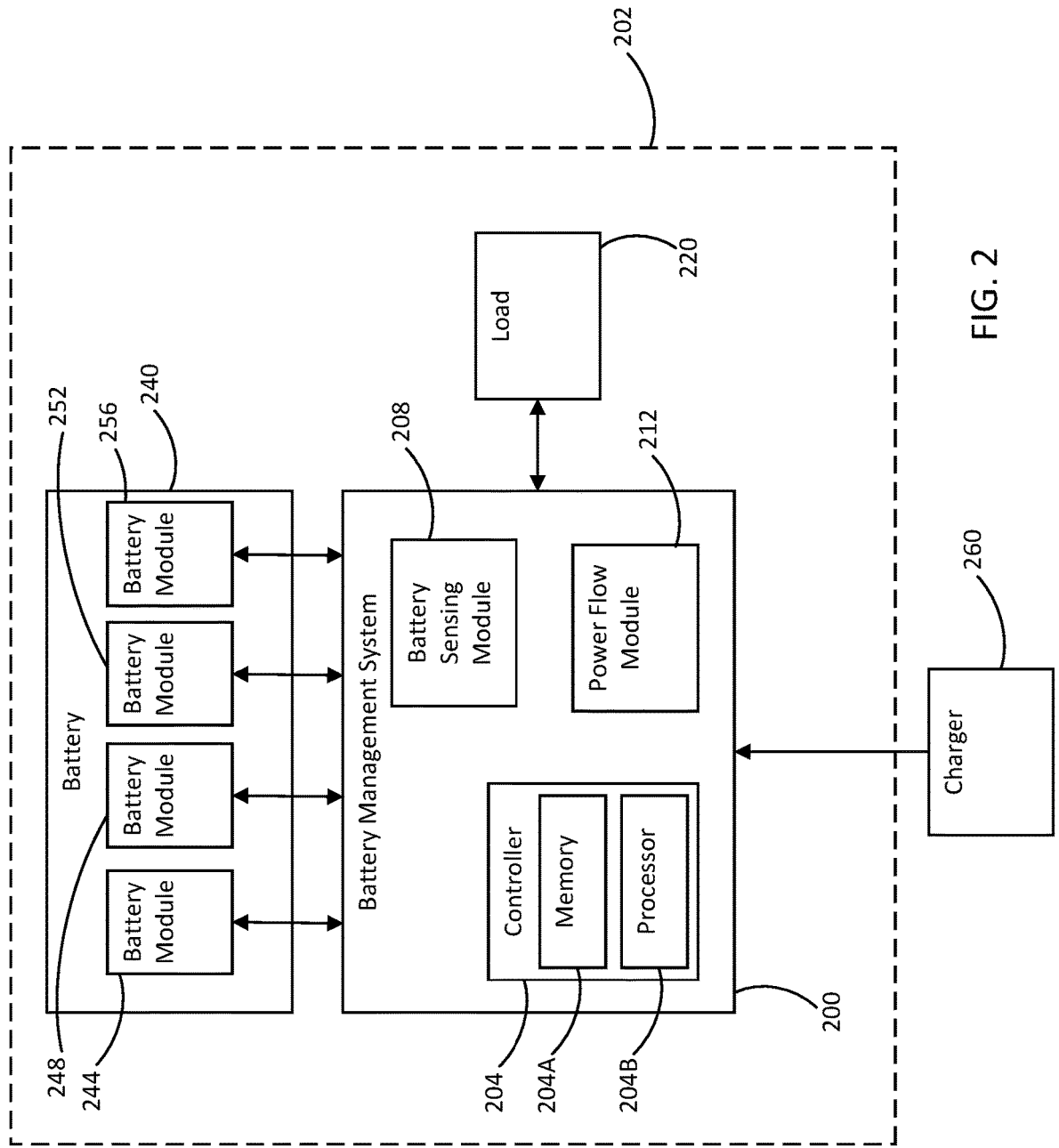
FIG. 2 is an exemplary block diagram of a battery management system of a material handling vehicle.

FIG. 2 shows an exemplary box diagram of a battery management system 200 of a material handling vehicle 202. The battery management system 200 can be coupled to a load 220 and a battery 240. The battery management system 200 may also be coupled to a charger 260 in order to charge the battery 240 when applicable.

The load 220 can include any number of systems of the material handling vehicle 202 that may require power from the battery 240. The systems can include propulsion systems, forklift systems, steering systems, or any other system used to handle materials. The load 220 may require a time varying amount of power/current from the battery 240 that varies according to the actions performed by the vehicle. For example, if the material handling vehicle 202 needs to propel itself forward while raising a material load, the power/current needs will be higher than if the material handling vehicle 202 is not moving and not raising a material load.

The battery 240 may be divided into any number of modules. In some embodiments, there can be a first battery module 244, a second battery module 248, a third battery module 252, and a fourth battery module 256. Each module may be of similar capacity, cell characteristics, and/or cell construction. Each battery module can be individually coupled to the battery management system 200. While four battery modules are shown, it is understood that the battery 240 may be divided into any number of modules.

The battery management system 200 can include a controller 204, a battery sensing module 208, and a power flow module 212 coupled to each other. The controller 204 may include a memory 204A and a processor 204B configured to execute instructions stored on the memory 204A. The controller may have a load management algorithm and a charging management algorithm stored as instructions on the memory. The load management algorithm and the charging management algorithm will be discussed in conjunction with FIG. 4 and FIG. 5 respectively. In some embodiments, the controller 204 may have a human-machine interface (HMI) configured to receive inputs or commands from a human operator. In some embodiments, the controller 204 may have a data interface 204C capable of connecting to an external computational device, network, or data storage medium via USB, Ethernet, Controller Area Network (CAN) bus, or other wired connection, or a WiFi, Bluetooth, or other wireless connection.

The memory 204A can be coupled to the processor 204B. In some embodiments, the processor 204B can be any suitable hardware processor or combination of processors, such as a central processing unit ("CPU"), a graphics processing unit ("GPU"), an application-specific integrated circuit (ASIC), etc., which can execute a program, which can include the processes described below.

In some embodiments, the memory 204A can include any suitable storage device or devices that can be used to store instructions, values, etc., that can be used, for example, execute process 400 and/or process 500 described below in conjunction with FIGS. 4 and 5. The memory 204A can include any suitable volatile memory, non-volatile memory, storage, or any suitable combination thereof. For example, the memory 204A can include RAM, ROM, EEPROM, one or more flash drives, one or more hard disks, one or more solid state drives, one or more optical drives, etc.

The battery sensing module 208 may include one or more sensors coupled to the load 220 and/or the battery modules 244, 248, 252, 256. The sensors can be configured to measure a parameter of the load 220 such as the current flowing to the load 220 from the battery management system 200. Additionally, the sensors can be configured to measure a parameter such as a current flowing to or from the battery 240 or one or more of the battery modules 244, 248, 252, 256 a voltage of one or more the battery 240 or the battery modules 244, 248, 252, 256, a pressure of the battery 240 or one or more of the battery modules 244, 248, 252, 256, or any other parameter that can be used to determine a state of charge and/or state of health of the battery 240 and/or one or more of the modules 244, 248, 252, 256. In some embodiments, the battery sensing module 208 can include be coupled to the battery via the data interface such as a USB interface or other transmission line capable of receiving data from a memory coupled to the battery. The battery sensing module can then receive data about the battery such as a model number, battery chemistry, battery cell construction, battery capacity, serial number, or other relevant information about the battery. The battery sensing module 208 can include one or more temperature sensors coupled to the battery modules 244, 248, 252, and 256 in order to sense the temperature of each battery module 244, 248, 252, and 256. The sensed temperature of each battery module 244, 248, 252, and 256 can be used to determine which battery modules are used to supply a load, as will be described below.

The controller 204 may aggregate the parameters measured from the battery modules 244, 248, 252, 256 in order to determine a state of charge and/or a depth of discharge (DoD) of each individual battery module and exerts outputs via actuators in order to control power flowing from the battery modules 244, 248, 252, 256. The controller 204 may also track lifetime parameters of the battery modules such as total number of charge/discharge cycles and/or state of health using the measured parameters.

The power flow module 212 can control the flow of power to and from the battery 240, battery modules 244, 248, 252, 256, load 220, and/or the charger 260. The power flow module 212 can include any number of passive components such as resistors, capacitors, inductors, transformers, solenoids, or amplifiers, active components such as diodes, transistors, integrated circuits, power sources, or transducers, voltage regulators, current regulators, chargers, bi-directional converters, fuses, actuators such as switches, sensors, or other electrical components configured to control and/or regulate power flow throughout the battery management system. The power flow module 212 can include a number of DC/DC converters. Each DC/DC converter can be coupled to different individual battery module. Each DC/DC converter can also be coupled to a common electrical bus. The DC/DC converters can convert a relative low voltage of the battery modules, for example, 12 VDC, to a relative higher voltage, such as 180 VDC, which can be used to power the material handling vehicle. The power flow module 212 may contain any number of actuators coupled to the controller 204, charger 260, load 220 and/or the battery 240. The controller 204 may control the state (i.e. on or off) of the actuator(s) in order to control the power flow between the battery 240, battery modules 244, 248, 252, 256, load 220, and/or the charger 260.

Figure 3:
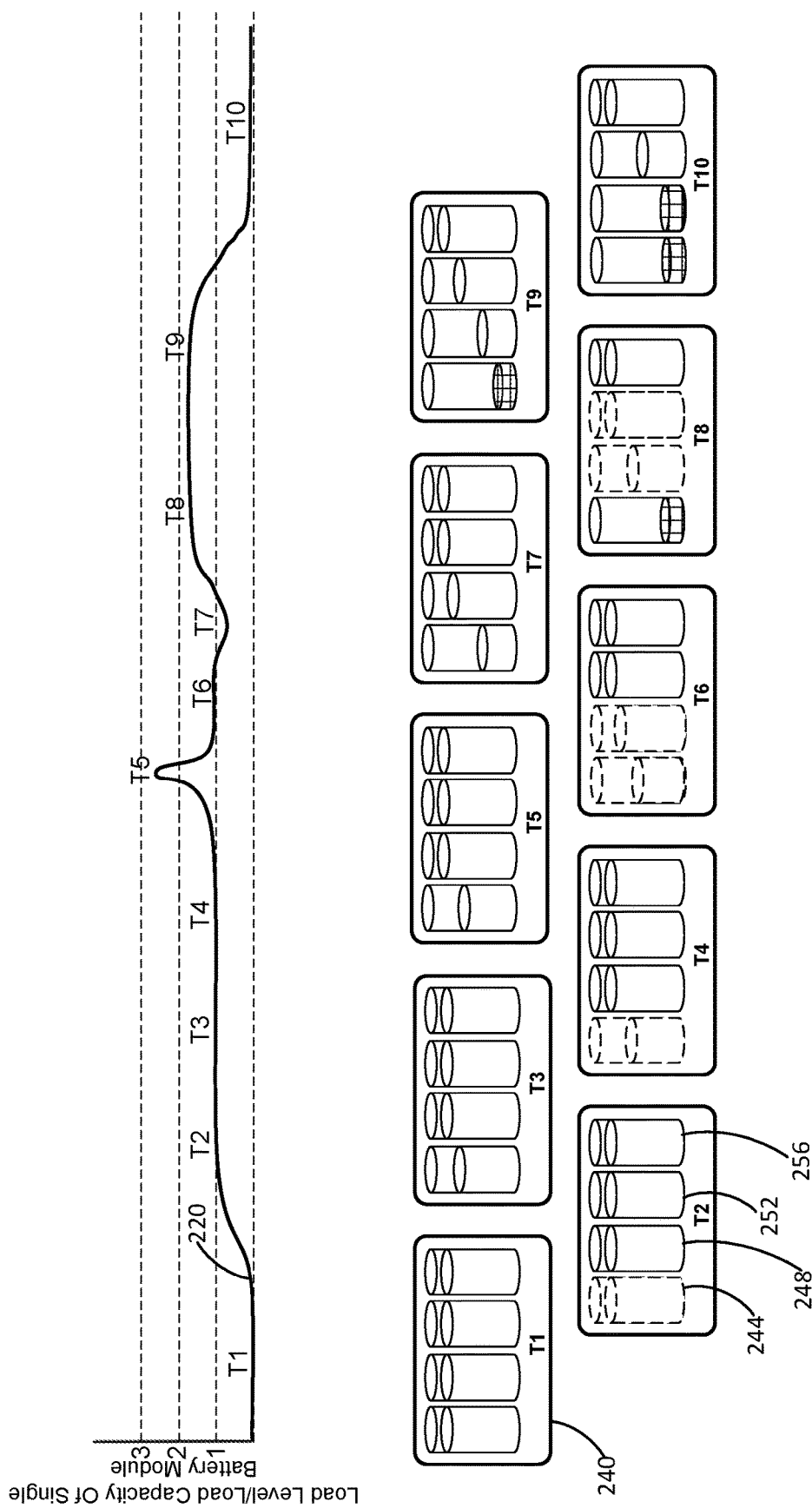
FIG. 3 is a graph of a time varying load of a battery management system.

Referring to FIG. 2 as well as FIG. 3, an illustration of the load 220 coupled to the battery management system 200 is shown. The load may be quantified by a required power or current magnitude, and may vary over time. The battery management system 200 may control the performance of a battery 240 in response to one or more parameters of the time varying load 220. The battery 240 can be divided into any number of modules. As described above, in some embodiments, each module can be a battery. The state of charge or charge level of each module 244, 248, 252, 256 is shown at various time points $T_1$-$T_{10}$. In FIG. 3, the load 220 is quantified relative to the load capacity of a single battery module. Each module can be rated at a nominal voltage. Each module can have a cell chemistry and/or a cell construction that is shared with at least one of the other modules. Each module can have a number of cells and/or volume that is shared with at least one other module. In some embodiments, all of the modules 244, 248, 252, 256 have the same cell chemistry. In some embodiments, there may be multiple batteries with any number of total modules that the battery management system 200 can control and/or monitor.

The battery management system 200 can have a battery profile corresponding to the battery 240 that allows the battery management system 200 to supply power in a manner for prolonging the useful life of the battery 240. The battery profile may include a set of desired operating parameters of the battery 240 such as a charge rate, a discharge rate, a depth-of-discharge (DoD) operating window, and/or environmental or cell temperature. The battery profile can be stored on a memory of the controller 204. When the battery 240 is operated at or within the desired operating parameters, the useful life of the battery 240 may be prolonged. The battery profile may have multiple sets of desired operating parameters in order to account for different environmental factors. For example, the battery 240 may operate better with different discharge rates, charge rates, and/or DoD operating windows for different environmental temperatures. In colder temperatures, the battery 240 may have a lower desired discharge rate than in warmer temperatures. The battery management system 200 may use more modules to supply a load with an arbitrary current requirement in colder temperatures than a load with the same arbitrary current requirement in warmer temperatures.

The battery management system 200 can selectively determine which modules of the battery 240 will supply power to the load 220 in a predetermined manner to promote extending the lifespan and/or charge of the battery 240. The battery management system 200 may track parameters and control power flow between the battery 240 and the load 220 and/or the modules using components as described above. As described above, each module may include a DoD window and a discharge rate that promote lifespan and/or charge extension. When the battery 240 is fully charged, all modules start at $T_1$ with a DoD at located at the upper end of the DoD window and all modules are ready to supply power to the load 220. The battery management system 200 may supply current/power to the load 220 using various modules over time. The battery management system 200 may keep the modules at or above a minimum charge or SOC level in order to keep the battery 240 able to support a relatively high load, which may require at least two modules. The minimum SOC charge level may be located inside or outside of the DoD window.

When the load 220 has a no load power requirement, such as at $T_1$, the battery management system 200 may prevent any module from supplying the load. At $T_1$, all of the battery modules 244, 248, 252, 256 have a state of charge at a nominal beginning-of-discharge level (e.g., fully charged). When the load 220 has a relatively low power requirement, such as at $T_2$, the battery management system 200 may determine that power to the load is best supplied by a single module. At $T_2$, the load 220 is increased to a level that requires one battery module to be engaged. For example, the battery management system 200 may determine that the load 220 will require a current approximately equal to the desired discharge rate of the modules of the cell. The battery management system 200 may also determine which of the modules has had the least number of total discharge cycles and select that module to supply the load 220 in order to balance the total usage of the modules and thereby maximize the lifecycle of the battery 240. In some embodiments, the battery management system 200 may also determine which of the modules has the least depth-of-discharge and/or a battery module temperature (i.e., a temperature sensed using a temperature sensor coupled to a battery module) corresponding to a discharge rate that is closest to the current required by the load 220. At $T_2$, the battery management system 200 chooses to have the first module 244 supply the load 220. At $T_3$ and $T_4$, the load 220 continues to stay at approximately the same level as at $T_2$, and the battery management system 200 may continue to have the first module 244 supply the load 220 if the charge level of first module 244 remains within the desired DoD window. The state of charge of the first battery module 244 decreases at $T_2$, $T_3$ and $T_4$. In some embodiments, the battery management system 200 may choose a different module to supply the load 220 if the current active module, i.e. the first module 244, has a charge level that is less than the charge level(s) of the other module(s) by a predetermined threshold level. This may allow the usage of the modules to be balanced, helping to maximize the lifecycle and/or time between charge cycles of the battery 240. In some embodiments, the battery management system 200 may choose a different module to supply the load 220 if the current active module, i.e. the first module 244, has a rate of discharge, module temperature, module voltage, voltage levels of cells within the module, time-at-discharge-rate, time-at-charge rate, or cell balancing state within the module that differs from the rate(s) of discharge, module temperature(s), module voltage (s), voltage levels of cells within the module(s), time-at-discharge-rate(s), time-at-charge rate(s), or cell balancing state within the module(s) of the other module(s) by a predetermined threshold level. This may also allow the usage of the modules to be balanced, helping to maximize the lifecycle and/or time between charge cycles of the battery 240.

When the load 220 has a relatively high power requirement, such as at $T_5$, the battery management system 200 may determine that power to the load is best supplied by three modules. The state of charge of each of the three modules will then be reduced. For example, the load may be equal to approximately three times a nominal load capacity of a battery module. The battery management system 200 can then select three modules to supply the load. At $T_5$, the battery management system 200 chooses to have the first module 244, the second module 248, and the third module 252 supply the load 220. The battery management system 200 may choose the three modules by continuing to use the already active module(s), i.e. the first module 244, and selecting additional modules to supply the load 220. In some embodiments, the battery management system 200 may choose the three modules with the highest charge levels to supply the load in order to balance the usage of the modules. In some embodiments, the battery management system 200 may choose as many battery modules that have a charge level within the desired DoD window to supply the load 220 in order to achieve maximum distribution of load across the battery 240 and minimize the load to each module. In some embodiments, battery management system 200 may choose modules that minimize the number of modules being utilized to supply the load based on the maximum discharge rate of each module based on real-time operating parameters such as battery module temperature, voltage, DoD, etc. In some embodiments, the battery management system 200 can supply the load 220 using multiple battery modules supplying varying power/current levels to satisfy the total load requested according to the real-time operating parameters (temperature, voltage, DoD etc.) of each battery module.

When the load 220 is a relatively moderate value, such as at $T_6$, the battery management system 200 may determine that power to the load is best supplied by two modules. At $T_6$, the load 220 reduces to relatively lower load level that will require two battery modules, and the state of charge of each of the two battery modules will be reduced. For example, the battery management system may determine that the load 220 will require a current approximately equal to two times the desired discharge rate of the modules of the cell, such as if the load 220 requires a current of 1.8 A, and the desired discharge rate of the modules is 1.0 A. The battery management system 200 can then select two modules to supply the load 220. At $T_6$, the battery management system 200 chooses to have the first module 244 and the second module 248 supply the load 220. The battery management system 200 may choose the two modules by continuing to use the two already active module(s) that have been in use the longest or the modules that have the lowest charge levels. In some embodiments, the battery management system 200 may choose the two modules with the highest charge levels to supply the load in order to balance the usage of the modules. In some embodiments, the battery management system 200 can "rotate" through battery modules in order to reduce the continuous discharge current by pulse a discharge current from two selected battery modules before switching the two battery modules selected to output the discharge current. In this way, the continuous discharge current from individual battery modules is reduced, which can prevent wear on the battery modules.

When the load 220 is a relatively low value, such as at $T_7$, the battery management system 200 may determine that power to the load is best supplied by one module. At $T_7$, the load can be reduced from $T_6$. For example, the battery management system may determine that the load 220 will require a current approximately equal to the desired discharge rate of the modules of the cell, such as if the load 220 requires a current of 1.1 A, and the desired discharge rate of the modules is 1.0 A. The battery management system 200 can then select one module to supply the load. At $T_7$, the battery management system 200 chooses to have the first module 244 supply the load 220. The battery management system 200 may choose the module by continuing to use the already active module that has been in use the longest or the module that has the lowest charge level. In some embodiments, the battery management system 200 may choose the module with the highest charge level to supply the load in order to balance the usage of the modules.

When one or more of the modules currently supplying the load reaches the bottom of the DoD window, such as at $T_8$, the battery management system 200 may choose one or more different modules to supply power to the load. The load 220 increases from $T_8$, and the state of charge of the first battery module 244 reaches a "low" threshold indicative that the first battery module 244 cannot provide more charge. Two different battery modules are then engaged to supply additional power. At $T_8$, the battery management system 200 may determine that power to the load is best supplied by two modules. For example, the battery management system may determine that the load 220 will require a current approximately equal to two times the desired discharge rate of the modules of the cell, such as if the load 220 requires a current of 2.4 A, and the desired discharge rate of the modules is 1.0 A. The battery management system 200 can then select two modules with charge levels within the DoD window to supply the load. At $T_8$, the battery management system 200 chooses to have the second module 248 and the third module 252 supply the load 220. The battery management system 200 may choose the two modules by continuing to use the two already active module(s) that have been in use the longest or the modules that have the lowest charge levels. In some embodiments, the battery management system 200 may choose the two modules with the highest charge levels to supply the load in order to balance the usage of the modules.

At $T_9$ the load 220 may stay approximately the same as at $T_8$, and the battery management system 200 may continue to have the second module 248 and the third module 252 supply the load 220 if the charge levels of the second module 248 and the third module 252 remain within the desired DoD window. The states of charge of the second module 248 and the third module 252 are reduced. When the load 220 has a power requirement of zero, such as at $T_{10}$, the battery management system 200 may prevent any module from supplying the load. At $T_{10}$, the state of charge of the second module 248 reaches the "low" threshold indicative that the second battery module 248 cannot provide more charge. In some embodiments, the battery management system 200, may prevent any battery module from supplying current at more than a predetermined discharge rate, which can be equal to the desired discharge rate.

Figure 4:
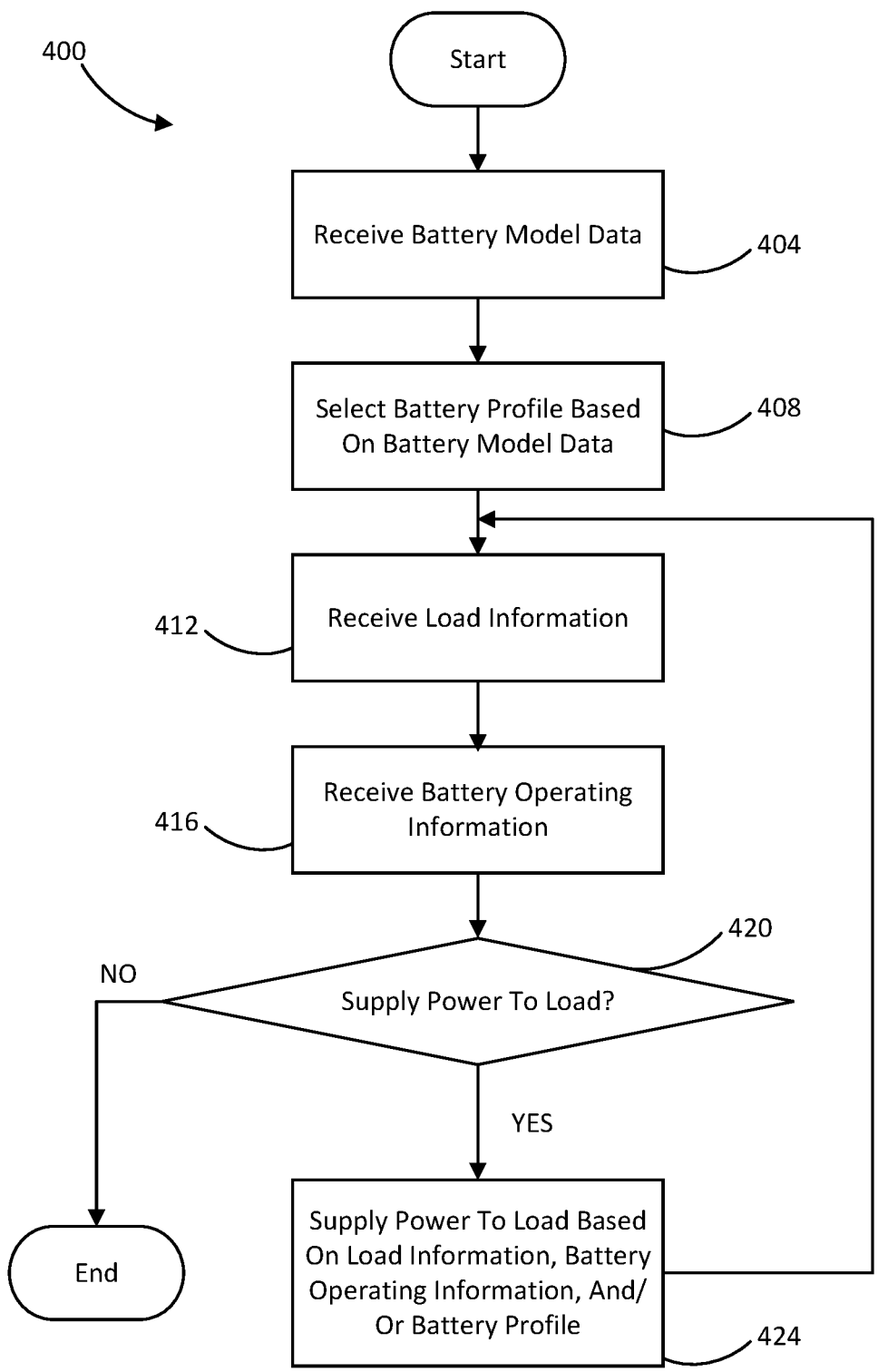
FIG. 4 is an example of a process for managing a load coupled to a battery.

Referring now to FIG. 2 as well as FIG. 4, an example of a process 400 for managing the load 220 coupled to the battery 240 is shown. In some embodiments, the process 400 can be implemented as instructions on at least one memory of a computational device such as the controller 204 and executed by at least one processor coupled to the memory.

At 404, the process 400 can receive battery model data. The battery model data can include a model number, serial number, battery chemistry, battery cell construction, battery capacity, or other relevant information about the battery 240. In some embodiments, the process 400 may receive the battery model data from a memory coupled to the battery 240 having the battery model data stored thereon. In some embodiments, the process 400 may receive the battery model data from a human-machine interface (HMI) of the controller 204, the HMI being configured to receive inputs or commands from a human operator. In some embodiments, the process 400 may receive the battery model data from a data interface of the controller 204 capable of connecting to an external computational device or network via USB, Ethernet, or other wired connection, or a WiFi, Bluetooth, or other wireless connection. The process 400 can then proceed to 408.

At 408, the process 400 can select a battery profile based on the battery model data. The battery profile may include battery specific data such as battery model, battery chemistry, battery cell construction, and/or battery capacity which may correspond to the battery 240 and/or the battery modules 244, 248, 252, 256 of the battery 240. The battery profile may also include one or more operating parameter sets associated with the battery 240. Each operating parameter set can include values of a number of parameters such as a charge rate, a discharge rate, a depth-of-discharge (DoD) operating window, and/or environmental or cell temperature. Each of the parameters included in the number of parameters can be referred to as "preferred" parameters, as When the battery 240 is operated at or within the desired operating parameters, the useful life of the battery 240 may be prolonged. The battery profile may have multiple sets of desired operating parameters in order to account for different environmental factors. The process 400 may have a predetermined set of battery profiles that correspond to various battery model, battery chemistry, battery cell construction, and/or battery capacity parameters of the battery 240 and/or modules 244, 248, 252, 256 of the battery 240. The process may select a battery profile from the set of battery profiles based on which battery profile most closely matches the battery model. For example, the process 400 may determine that a target battery profile of the set of battery profiles has a battery model matching the current battery 240, and select the target battery profile. In some embodiments, the battery profile can be implemented as one or more equations corresponding to batteries (and battery modules) based on the battery model data. For example, the process 400 can select one or more equations corresponding to a battery having the model number, battery chemistry, battery cell construction, and/or battery capacity included in the battery model data. In some embodiments, the battery profile can be implemented a machine learning technique such as an artificial neural network. The artificial neural network can be trained using operating data in a variety of operating conditions (i.e., various temperatures, currents supplied, etc.). Once trained, the artificial neural network can provide commanded output states in response to newly-encountered input operating conditions. The process 400 can then proceed to 412.

At 412, the process 400 can sense load information about a load 220. In some embodiments, the process 400 can receive the load information from one or more sensors coupled to the load 220. In some embodiments, the load information can include a current flowing to the load 220, an impedance of the load 220, or any other parameter that may be used to determine power requirements of the load 220. The sensors can be included in the battery sensing module 208. The process 400 may directly use the load information received to determine the power requirement or current requirement of the load 220. Alternatively, the process 400 may calculate a power requirement or current requirement of the load 220 based on the load information in order to determine the power requirement or current requirement of the load 220. In some embodiments, the current requirement can be formatted as an amperage requirement. In some embodiments, the load 220 can communicate a power requirement or current requirement to the process 400. The load 220 can then be required to maintain its power or current consumption within the allowed load level. The process 400 can then proceed to 416.

At 416, the process 400 can receive battery operating information about the battery 240. The battery operating information can include a current flowing to or from the battery 240 or one or more of the battery module 244, 248, 252, 256 244, 248, 252, 256, a voltage of one or more the battery 240 or the battery modules 244, 248, 252, 256, a pressure of the battery 240 or one or more of the battery modules 244, 248, 252, 256, or any other parameter that can be used to determine a state of charge of the battery 240 and/or one or more of the modules 244, 248, 252, 256. The process 400 may use the battery operating information from multiple points in time to calculate the state of charge of the battery 240 and/or individual modules 244, 248, 252, 256 using methods known in the art. The battery operating information may also include environmental information about the battery 240 such as a temperature of the battery 240 and/or one or more of the modules 244, 248, 252, 256. The process 400 can then proceed to 420.

At 420, the process 400 can determine whether or not to supply power to the load 220. The process may device whether or not to supply power to the load 220 based on the battery operating information. If the battery 240 is determined to be out of charge, such as if all modules 244, 248, 252, 256 of the battery 240 are depleted, or if all battery modules 244, 248, 252, 256 have a charge level at the bottom of the desired DoD window, the process 400 may determine not to supply the load 220 with power. The process 400 may determine to supply the load 220 with power if at least one battery module has a charge level above the bottom of the desired DoD window or if at least one battery module is not depleted. If the process 400 determines to not supply power to the load 220, the process can then end. If the process 400 determines to supply power to the load 220, the process 400 can proceed to 424.

At 424, the process 400 can supply power to the load 220 based on the load information, the battery operating information, and/or the battery profile. In some embodiments, the process 400 can select a target operating parameter set included in the one or more operating parameter sets based on environmental information included in the battery operating information. For example, the process 400 can select an operating parameter set having an environmental or cell temperature closest to the operating temperature of the battery included in the battery information as the target operating parameter set. The process 400 can then operate the battery modules 244, 248, 252, 256 based on the target operating parameter set. Using multiple operating parameter sets can allow the process 400 to supply the load 220 using an operating parameter set most suitable for environmental conditions and/or operating conditions of the battery. For example, the process 400 can select a first operating parameter set included in the plurality of operating parameter sets as the target operating parameter set. The first operating parameter set can include a first preferred discharge rate, a first preferred depth of discharge range, and a first environmental factor (e.g., a first preferred battery temperature). The process 400 may select the first operating parameter set instead of a second operating parameter set including a second preferred discharge rate, a second preferred depth of discharge range, and a second environmental factor (e.g., a second preferred battery temperature) because the first environmental factor is closer to the battery operating information than the second environmental factor. For example, the first preferred battery temperature may be closer to the actual battery operating temperature than the second preferred battery temperature, and operating the battery 240 based on the first preferred battery temperature may extend the lifespan of the battery. Certain parameter values may differ between the first operating parameter set and the second operating parameter set. For example, the first preferred battery temperature may be less than the second preferred battery temperature, and the first preferred discharge rate may be less than the second preferred discharge rate. In some embodiments, the first environmental factor can be a first preferred battery temperature range and the second environmental factor can be a second preferred battery temperature range. The first preferred battery temperature range can include common temperatures found in warehouses and/or other storage facilities. For example, the first preferred battery temperature range can include 60-100° F., 60-80° F., 60-75° F., 70-100° F., 80-100° F., 65-95° F., 70-90° F., and/or other subranges between 60-100° F. In some embodiments, the second preferred battery temperature range can include 60-100° F., 60-80° F., 60-75° F., 70-100° F., 80-100° F., 65-95° F., 70-90° F., and/or other subranges between 60-100° F. In some embodiments, the second preferred battery temperature range can include temperatures outside of 60-100° F. For example, the second preferred battery temperature range can include 55-100° F., 55-80° F., 40-65° F., 70-110° F., 80-120° F., 80-110° F., 70-105° F., etc. In some embodiments, the process 400 can supply power to the load 220 differently based on the battery operational temperature. For example, if the process 400 selects the first parameter set because the battery operational temperature falls within the first preferred battery temperature range and not the second preferred battery temperature range, the process 400 may supply the load with a different number of battery modules (e.g., because the preferred discharge rate included in the first parameter set is different than the preferred discharge rate included in the first parameter set).

The process 400 can determine which portion of the battery modules 244, 248, 252, 256 to use in order to supply the load 220. To begin, the process 400 can calculate a most desired number of battery modules 244, 248, 252, 256. The desired number of battery modules 244, 248, 252, 256 can be the number of battery modules 244, 248, 252, 256 that would be able to supply power to the load 220 and keep the battery modules 244, 248, 252, 256 closest to the desired discharge rate of the battery modules 244, 248, 252, 256, or under a maximum discharge rate of the battery modules 244, 248, 252, 256, as stored in the battery profile. The desired discharge rate and/or the maximum discharge rate can be less than a maximum allowable discharge rate of the battery 240 and/or battery modules 244, 248, 252, 256 (e.g., less than the manufacturer's maximum rated discharge rate). The process 400 may also utilize battery environmental information such as the temperature of the battery 240 to select the desired discharge rate at that temperature based on the battery profile. The process 400 can then determine a most desired portion of the battery modules 244, 248, 252, 256 to supply power to the load 220. For example, the process 400 may determine the most desired number of battery modules 244, 248, 252, 256 is three and select the three battery modules 244, 248, 252, 256 that have charge levels within the desired DoD window from the battery profile. The battery modules 244, 248, 252, 256 can then be selected using additional conditions such as the selecting three lowest charge levels within the desired DoD window, selecting the three highest charge levels within the desired DoD window, selecting as many of the battery modules 244, 248, 252, 256 that are already supplying power to the load 220, and/or any other condition that may help maximize the lifecycle and/or time between charge cycles of the battery 240 and/or the battery modules 244, 248, 252, 256. Once the battery modules are selected, the process 400 can actuate actuators such as switches coupled to the battery modules 244, 248, 252, 256 and the load 220 in order to supply power to the load 220 using the selected battery modules. The actuators can be included in the power flow module 212. The process 400 can then proceed to 412. The process 400 may perform steps 412-424 multiple times per second in order to accommodate dynamic load requests without introducing a perceptible delay to an operator.

Figure 5:
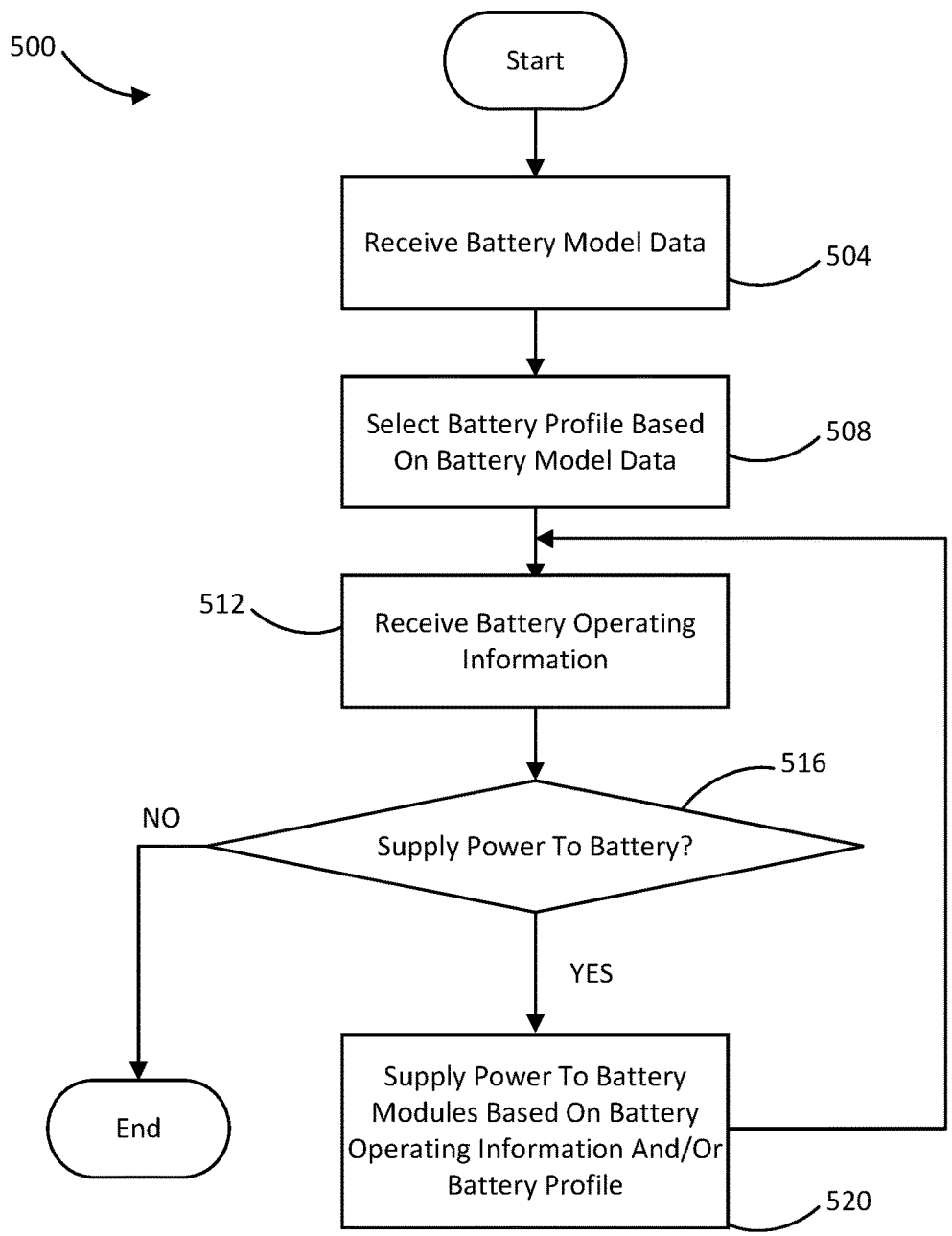
FIG. 5 is an example of a process for charging a battery.

Referring now to FIG. 2 as well as FIG. 5, an example of a process 500 for charging the battery 240 is shown. The process 500 may be executed when the battery management system 200 is coupled to the charger 260. The process 500 may also be executed when a material handling vehicle is performing regenerative charging, such as when a lift of the material handling vehicle is being lowered or when the material handling vehicle is braking. The process 500 can be implemented as instructions on a memory of a computational device such as the controller 204.

At 504, the process 500 can receive battery model data. The battery model data can include a model number, serial number, battery chemistry, battery cell construction, battery capacity, or other relevant information about the battery 240. In some embodiments, the process 500 may receive the battery model data from a memory coupled to the battery 240 having the battery model data stored thereon. In some embodiments, the process 500 may receive the battery model data from a human-machine interface (HMI) of the controller 204, the HMI being configured to receive inputs or commands from a human operator. In some embodiments, the process 500 may receive the battery model data from a data interface of the controller 204 capable of connecting to an external computational device or network via USB, Ethernet, or other wired connection, or a WiFi, Bluetooth, or other wireless connection. The process 500 can then proceed to 508.

At 508, the process 500 can select a battery profile based on the battery model data. The battery profile may include battery specific data such as battery model, battery chemistry, battery cell construction, and/or battery capacity which may correspond to the battery 240. The battery profile may also include a set of desired operating parameters of the battery 240 such as a charge rate, a discharge rate, a depth-of-discharge (DoD) operating window, and/or environmental or cell temperature. When the battery 240 is operated at or within the desired operating parameters, the useful life of the battery 240 may be prolonged. The battery profile may have multiple sets of desired operating parameters in order to account for different environmental factors. The process 500 may have a predetermined set of battery profiles that correspond to various battery models, battery chemistries, battery cell constructions, and/or battery capacity parameters of the battery 240. The process may select a battery profile from the set of battery profiles based on which battery profile most closely matches the battery model. For example, the process 500 may determine that a target battery profile of the set of battery profiles has a battery model corresponding to the current battery 240, and select the target battery profile. In some embodiments, the battery profile can be implemented as one or more equations corresponding to batteries (and battery modules) based on the battery model data. For example, the process 500 can select one or more equations corresponding to a battery having the model number, battery chemistry, battery cell construction, and/or battery capacity included in the battery model data. In some embodiments, the battery profile can be implemented a machine learning technique such as an artificial neural network. The artificial neural network can be trained using operating data in a variety of operating conditions (i.e., various temperatures, currents supplied, etc.). Once trained, the artificial neural network can provide commanded output states in response to newly-encountered input operating conditions. The process 500 can then proceed to 512.

At 512, the process 500 can receive battery operating information about the battery 240. The battery operating information can include a current flowing to or from the battery 240 or one or more of the battery modules 244, 248, 252, 256, a voltage of one or more the battery 240 or the battery modules 244, 248, 252, 256, a pressure of the battery 240 or one or more of the battery modules 244, 248, 252, 256, or any other parameter that can be used to determine a state of charge of the battery 240 and/or one or more of the modules 244, 248, 252, 256. The process 500 may use the battery operating information from multiple points in time to calculate the state of charge of the battery 240 and/or individual modules using methods known in the art. The battery operating information may also include environmental information about the battery 240 such as a temperature of the battery 240 and/or one or more of the modules 244, 248, 252, 256. The process 500 can then proceed to 516.

At 516, the process 500 can determine whether or not to supply power to one or more modules 244, 248, 252, 256 of the battery 240. If the process 500 determines all of the battery modules 244, 248, 252, 256 have charge levels at the upper limit of the desired DoD window of the battery profile, the process 500 may end. If the process 500 determines that at least one battery module has a charge level less than the upper limit of the DoD window, the process 500 may proceed to 520.

At 520, the process 500 may supply power to the battery modules 244, 248, 252, 256 based on the battery operating information and/or the battery profile. The process 500 may determine which battery modules have charge levels below the desired DoD operating window based on the battery information. The process 500 can then determine a desired charge rate for the battery modules 244, 248, 252, 256 based on the battery profile. The process 500 may also utilize battery environmental information such as the temperature of the battery 240 to select the desired charge rate at that temperature based on the battery profile. The process 500 may then actuate actuators in order to supply power to the selected battery modules at the desired charge rate. In some embodiments, the battery modules 244, 248, 252, 256 may be coupled to circuitry located, for example, in the battery 240 or the power flow module 212, and configured to provide a charge rate at or near the desired charge rate, and simply actuate one or more actuators in order to provide power from the circuitry to the one or more battery modules 244, 248, 252, 256 determined to have charge levels below the desired DoD operating window. The actuators can be included in the power flow module 212. The process 500 can then proceed to 512.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIG. 4 or FIG. 5 can be executed or performed in any order or sequence not limited to the order and sequence shown and described in the figures. Also, some of the above steps of the processes of FIG. 4 or FIG. 5 can be executed or performed substantially simultaneously where appropriate or in parallel to reduce latency and processing times.

Using aspects of the disclosure, a battery management system may maximize the useful life of batteries.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention includes what has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A battery management system, the battery management system comprising:
   a battery sensor coupled to a battery comprising at least one battery module, the at least one battery module being associated with a preferred depth of discharge range and a preferred discharge rate;
   a load sensor coupled to a load;
   an actuator coupled to the at least one battery module and the load; and
   a controller coupled to the battery sensor, the load sensor, and the actuator, the controller comprising at least one processor and at least one memory, the at least one memory comprising instructions executed by the at least one processor to:
   receive load information about the load from the load sensor;
   receive battery operating information from the battery sensor;
   determine a number of battery modules needed to supply the load and operate each battery module at or below the preferred discharge rate based on the load information and the battery operating information;
   select a group of battery modules included in the battery based on the number of battery modules and the battery operating information, each battery module included in the group of battery modules having a current depth of discharge within the preferred depth of discharge range; and
   instruct the battery to supply the load using the group of battery modules.

2. The battery management system of claim 1, wherein the battery comprises at least two battery modules, and wherein the number of battery modules a first battery module and a second battery modules included in the battery.

3. The battery management system of claim 1, wherein the battery is a lithium-ion battery.

4. The battery management system of claim 1, wherein a minimum depth of discharge of the preferred depth of discharge range is greater than a predetermined minimum state of charge associated with the at least one battery module.

5. The battery management system of claim 1, wherein the preferred discharge rate is less than a maximum allowable discharge rate associated with the at least one battery module.

6. The battery management system of claim 5, wherein the preferred depth of discharge range and the maximum allowable discharge rate are previously determined based on testing.

7. The battery management system of claim 6, wherein the testing comprises operating a plurality of batteries at a plurality of predetermined discharge ranges and a plurality of predetermined maximum allowable discharge rates.

8. The battery management system of claim 1, wherein the at least one processor further executes the instructions to:
   receive a battery profile comprising a plurality of operating parameter sets, each operating parameter set comprising a preferred discharge rate, a preferred depth of discharge range, and at least one environmental factor.

9. The battery management system of claim 8, wherein
a first operating parameter set included in the plurality of operating parameter sets includes a first discharge rate, a first preferred depth of discharge range, and a first environmental factor,
a second operating parameter set included in the plurality of operating parameter sets includes a second discharge rate, a second preferred depth of discharge range, and a second environmental factor, and
at least one of the first discharge rate differs from the second discharge rate, the first preferred depth of discharge range differs from the second preferred depth of discharge range, or the first environmental factor differs from the second environmental factor.

10. The battery management system of claim 9, wherein the battery operation information comprises a battery operational temperature, and wherein the first environmental factor is a first preferred battery temperature range and the second environmental factor is a second preferred battery temperature range, the first preferred battery temperature range including the battery operational temperature, and the second preferred battery temperature range not including the battery operational temperature.

11. A battery management system, the battery management system comprising:
a battery sensor coupled to a battery comprising at least two battery modules;
a load sensor coupled to a load;
an actuator coupled to the at least two battery modules and the load; and
a controller coupled to the battery sensor, the load sensor, and the actuator, the controller comprising at least one processor and at least one memory, the at least one memory comprising instructions executed by the at least one processor to:
receive a battery profile comprising a plurality of operating parameter sets, each operating parameter set comprising a preferred discharge rate, a preferred depth of discharge range, and at least one environmental factor;
receive load information about the load from the load sensor;
receive battery operating information from the battery sensor;
select a target operating parameter set included in the plurality of operating parameter sets based on the battery operating information;
determine a number of battery modules needed to supply the load based on the load information, the battery operating information, and target operating parameter set;
select a group of battery modules included in the battery based on the number of battery modules and the battery operating information; and
instruct the battery to supply the load using the group of battery modules.

12. The battery management system of claim 11, wherein the battery operating information comprises a battery operating temperature and the at least one environmental factor comprises a preferred battery temperature, and wherein the at least one processor further executes the instructions to:
determine that the target operating parameter set includes a preferred battery temperature closer to the battery operating temperature than all other operating parameter sets included in the plurality of operating parameter sets.

13. The battery management system of claim 12, wherein the load information comprises an amperage requirement, and wherein the at least one processor further executes the instructions to:
determine the number of battery modules needed to both meet the amperage requirement and discharge each battery module included in the group of battery modules at an operational discharge rate closest to the preferred discharge rate.

14. The battery management system of claim 11, wherein
a first operating parameter set included in the plurality of operating parameter sets includes a first discharge rate, a first preferred depth of discharge range, and a first environmental factor,
a second operating parameter set included in the plurality of operating parameter sets includes a second discharge rate, a second preferred depth of discharge range, and a second environmental factor, and
at least one of the first discharge rate differs from the second discharge rate, the first preferred depth of discharge range differs from the second preferred depth of discharge range, or the first environmental factor differs from the second environmental factor.

15. The battery management system of claim 14, wherein the battery operation information comprises a battery operational temperature, and wherein the first environmental factor is a first preferred battery temperature range and the second environmental factor is a second preferred battery temperature range, the first preferred battery temperature range including the battery operational temperature, and the second preferred battery temperature range not including the battery operational temperature.

16. A battery management method comprising:
receiving load information about a load from a load sensor coupled to the load;
receiving battery operating information from a battery sensor coupled to a battery comprising a plurality of battery modules;
determining a number of battery modules needed to supply the load and operate each battery module included in the battery at or below a preferred discharge rate based on the load information and the battery operating information;
selecting a group of battery modules included in the battery based on the number of battery modules and the battery operating information, each battery module included in the group of battery modules having a current depth of discharge within a preferred depth of discharge range; and
instructing the battery to supply the load using the group of battery modules.

17. The method of claim 16, wherein the battery is a lithium-ion battery comprising at least two battery modules, and wherein the number of battery modules a first battery module and a second battery modules included in the battery.

18. The method of claim 16 further comprising:
receiving a battery profile comprising a plurality of operating parameter sets.

19. The method of claim 18, wherein
a first operating parameter set included in the plurality of operating parameter sets includes a first discharge rate, a first preferred depth of discharge range, and a first environmental factor, a second operating parameter set included in the plurality of operating parameter sets includes a second discharge rate, a second preferred depth of discharge range, and a second environmental factor, and at least one of the first discharge rate differs from the second discharge rate, the first preferred depth of discharge range differs from the second preferred depth of discharge range, or the first environmental factor differs from the second environmental factor.

20. The method of claim 19, wherein the battery operation information comprises a battery operational temperature, and wherein the first environmental factor is a first preferred battery temperature range and the second environmental factor is a second preferred battery temperature range, the first preferred battery temperature range including the battery operational temperature, and the second preferred battery temperature range not including the battery operational temperature.

* * * * *